T. A. WILLARD.
STORAGE BATTERY.
APPLICATION FILED APR. 29, 1915.
1,150,917.
Patented Aug. 24, 1915.
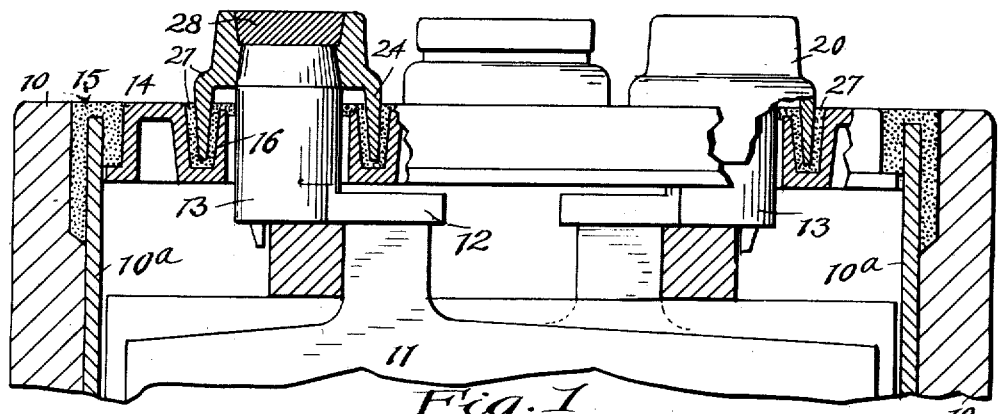
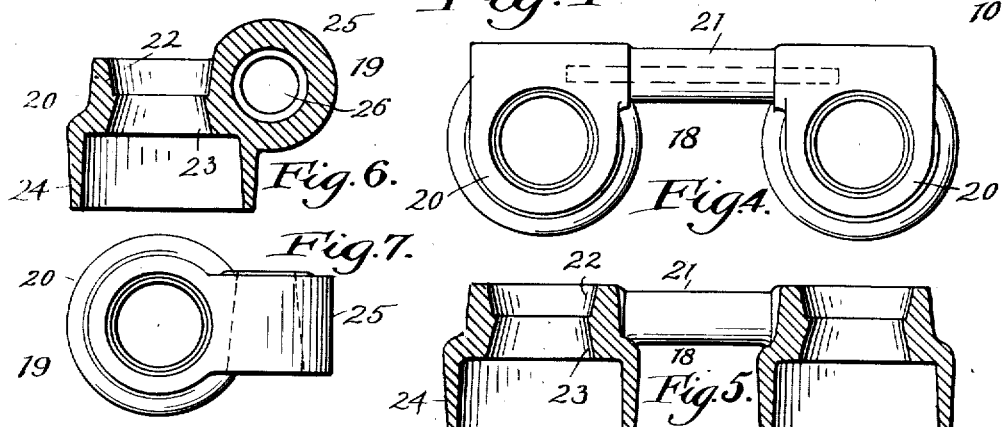
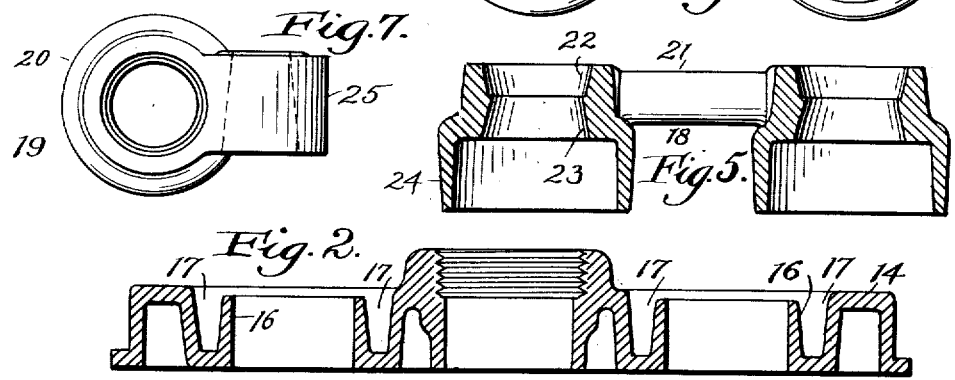
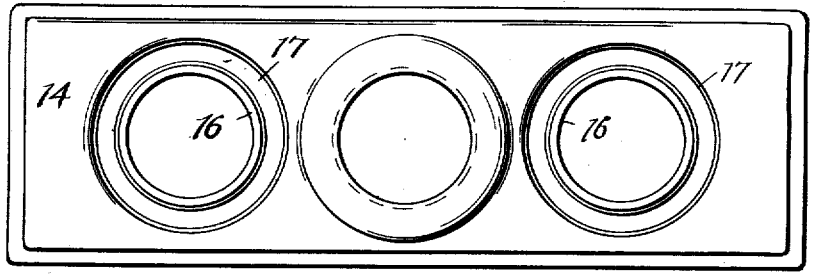
Witnesses
E. B. Gilchrist
L. I. Porter
Inventor
Theodore A. Willard
by Thurston & Kwis
attys.

UNITED STATES PATENT OFFICE.

THEODORE A. WILLARD, OF CLEVELAND, OHIO, ASSIGNOR TO THE WILLARD STORAGE BATTERY COMPANY, OF CLEVELAND, OHIO, A CORPORATION OF OHIO.

STORAGE BATTERY.

1,150,917.  Specification of Letters Patent.  Patented Aug. 24, 1915.

Application filed April 29, 1915. Serial No. 24,634.

*To all whom it may concern:*

Be it known that I, THEODORE A. WILLARD, a citizen of the United States, residing at Cleveland, in the county of Cuyahoga and State of Ohio, have invented a certain new and useful Improvement in Storage Batteries, of which the following is a full, clear, and exact description.

This invention relates to storage batteries, and especially to means for sealing the terminal posts for the prevention of creepage of battery solution around the posts to the exterior of the battery cover.

The main object of the invention is to provide a construction such that there is secured an automatic sealing as the parts are assembled, and particularly when the connectors are secured on to the terminal posts.

A further object is to facilitate and reduce the expense of assembling, and particularly of sealing the posts, and to do away with the necessity of closely and accurately fitting parts.

My invention may be briefly summarized as consisting in certain novel details of construction and combinations and arrangements of parts which will be described in the specification and set forth in the appended claims.

In the accompanying sheet of drawings, Figure 1 is a vertical sectional view through a storage battery embodying my improvements; Fig. 2 is a sectional view through the cover; Fig. 3 is a top plan view of the cover; Figs. 4 and 5 are, respectively, a top plan and a sectional view through a connector adapted to connect plates of adjoining cells; Figs. 6 and 7 are, respectively, a top plan and a sectional view through a terminal connector adapted to be employed with the present invention, and forming a part thereof.

Referring now to the drawings, 10 represents the battery box which, as is customary, contains a plurality of receptacles or jars $10^a$ which may be of rubber, and one of which is here shown. The battery jar contains the positive and negative battery plates 11, the plates of the two polarities being connected together in the usual manner by straps 12, from which extend upwardly positive and negative lead terminal posts 13.

The battery is provided with a cover 14 which may be formed of hard rubber, and is sealed around its edge or perimeter with cement or sealing compound 15. The cover is provided with openings through which the terminal posts loosely extend and with annular vertical flanges 16 which surround the posts and are spaced therefrom and which extend substantially from the lower plane of the cover to nearly the top plane thereof. The cover is provided also with annular grooves or depressions 17 which surround the flanges 16 and are concentric therewith, these grooves or depressions extending deeply downward from the top plane of the cover nearly to the lower plane thereof. Preferably the inner flange or wall of the groove or depression is of less height than the outer wall as shown. These grooves or depressions constitute receptacles or chambers which receive sealing compound and into which the lower portions of the connectors project or extend, as will be subsequently explained.

The terminal posts extend upward from the straps 12 centrally or substantially centrally through the annular upstanding flanges 16 on the cover, the ends of the posts projecting upwardly beyond the cover. The posts are of less diameter than the openings through the flanges, and do not engage the latter, it being unnecessary in view of the novel sealing feature to be described that the posts fit closely in the flanges, or in fact that there be any fixed relationship between the diameter of the posts and the diameter of the openings through which the posts extend, or that there be any fixed or definite positioning of these parts.

Secured on to the top of each post 13 is a lead connector which may consist either of a cell connector 18 (see Figs. 4 and 5) adapted to connect together the plates of adjoining cells, or a terminal connector 19 (see Figs. 6 and 7), by which positive or negative leads or conductors may be connected to the two end terminals of the battery. Each connector 18 is composed of two socketed body portions 20 and a connecting portion 21, the socket in each body portion 20 having upper and lower parts 22 and 23 beveled in opposite directions. Additionally, each socketed body portion is provided with a downwardly extended tapered flange or so-called petticoat 24, the purpose of which will be explained. Each terminal connector 19 is composed of a body portion 20 having a socket composed of oppositely inclined or beveled portions 22 and 23, and also a downwardly extending flange or petticoat 24 similar in all respects to the corresponding portions of the connector 18. Additionally, the connection 19 is provided at one side of the socket with a boss 25 having a socket 26 into which the end or terminal of a flexible lead or conductor may be secured. It is due to this flange or petticoat on the connector and to the coöperating parts of the cover, including the depressions surrounding the flanges 16 that I am able to automatically seal the posts in the cover when the connectors are placed on the posts. In order that this may be accomplished, before the connector is placed on the post the annular groove or recess 17 surrounding the flange 16 is filled or substantially filled with a cement or sealing compound 27, which when placed in a groove may be and preferably is in substantially semi-solid condition. Before the connector 18 or 19 is placed on the post, it is heated, so that the sealing compound will soften sufficiently to enable the flange or petticoat to be forced down into the sealing compound its full distance, the upper beveled end of the post then fitting closely into the lower beveled portion 23 of the socketed part 20. Then, the connector is lead burned on to the post, the melted lead filling the upper beveled part 22 of the socket in the connector, this melted lead being shown at 28 in Fig. 1. The heat applied during the lead burning passes by conduction down the flange or petticoat 24 and melts or liquefies the sealing compound, automatically forming a seal which prevents creepage of acid or battery solution along the post to the outside of the cover. In this manner not only is the terminal very effectively sealed, but it is accomplished inexpensively, and the parts can be assembled quickly and the accurate fitting and positioning of the parts heretofore required is eliminated, while at the same time the appearance, durability and efficiency of the battery is not impaired.

I do not desire to be confined to the exact details shown, but aim to cover in my claims all modifications which do not involve a departure from the spirit and a scope of my invention.

Having thus described my invention, what I claim is:—

1. In a storage battery, a container or jar having a cover provided with an opening for a terminal post and with a receptacle surrounding the opening, a terminal post extending upwardly through said opening, and a connector on said post, said connector having a portion extending downwardly along the post into said receptacle and sealed therein.

2. In a storage battery, a container or jar having a cover provided with an opening for a terminal post and with a depression surrounding the opening, a terminal post extending upwardly through said opening, and a connector on said post, said connector having a portion extending downwardly along the post beneath the top of the cover into said depression, said downwardly extending portion of the connector being sealed in said depression.

3. In a storage battery, a container having a cover provided with an opening for a terminal post and with a receptacle surrounding the opening and containing sealing compound, a terminal post extending upwardly through said opening, a connector having a socket which receives the upper end of the post and having a portion extending downwardly in the direction of the axis of the post into the sealing compound contained in said receptacle.

4. In a storage battery, a container having a cover provided with an opening for a terminal post and with a depression surrounding the opening and containing sealing compound, a terminal post extending upwardly through said opening, and a connector on said post having a flange extending downward in substantially the direction of the action of the post into the sealing compound and loosely surrounding the post.

5. In a storage battery, a container having a cover provided with an opening and with an annular depression surrounding the opening, a terminal post extending upwardly through the opening, a connector on said post and provided with a downward extension loosely surrounding the post and extending into the annular depression, and a sealing compound contained in said depression.

6. In a storage battery, a container having a cover provided with an opening for a terminal post and with a groove or depression surrounding the opening and containing sealing material, a terminal post extending upwardly through said opening, a connector provided with a socket which receives said post, the latter being secured and sealed therein, and said connector provided also with a flange which extends downward from the socketed portion into the sealing material contained in the groove or depression.

7. In a storage battery, a container having a cover provided with an opening, with an upstanding flange surrounding the opening and with a groove or depression surrounding the flange and containing sealing material, a terminal post extending upwardly through the opening, a connector on the post provided with a flange which extends downward from the connector into the sealing material in said groove or depression.

In testimony whereof, I hereunto affix my signature in the presence of two witnesses.

THEODORE A. WILLARD.

Witnesses:
L. I. PORTER,
A. J. HUDSON.

Correction in Letters Patent No. 1,150,917.

It is hereby certified that in Letters Patent No. 1,150,917, granted August 24, 1915, upon the application of Theodore A. Willard, of Cleveland, Ohio, for an improvement in "Storage Batteries," an error appears in the printed specification requiring correction as follows: Page 2, line 104, claim 4, for the word "action" read *axis;* and that the said Letters Patent should be read with this correction therein that the same may conform to the record of the case in the Patent Office.

Signed and sealed this 2nd day of November, A. D., 1915.

[SEAL.]

R. F. WHITEHEAD,
*Acting Commissioner of Patents.*